United States Patent
Somogyi

(10) Patent No.: US 6,176,035 B1
(45) Date of Patent: Jan. 23, 2001

(54) FISHING LURE

(76) Inventor: Paul Frank Somogyi, R.D. 2 Box 390, Clymer, PA (US) 15728

( * ) Notice: Under 35 U.S.C. 154(b), the term of this patent shall be extended for 0 days.

(21) Appl. No.: 09/361,140

(22) Filed: Jul. 27, 1999

(51) Int. Cl.[7] .................................................. A01K 85/12
(52) U.S. Cl. ..................... 43/42.14; 43/42.19; 43/42.2; 43/42.31; 43/42.46
(58) Field of Search ............................... 43/42.06, 42.12, 43/42.14, 42.16, 42.17, 42.19, 42.2, 42.31, 42.35, 42.39, 42.46

(56) References Cited

U.S. PATENT DOCUMENTS

| Re. 13,499 | * | 12/1912 | Breder . |
| 661,788 | * | 11/1900 | Brooke . |
| 667,257 | * | 2/1901 | Shakespeare, Jr. . |
| 1,140,279 | * | 5/1915 | Myers . |
| 1,989,850 | * | 2/1935 | Dorsey . |
| 2,472,639 | * | 6/1949 | Wickens . |
| 2,494,407 | * | 1/1950 | Rhodes . |
| 2,569,057 | * | 9/1951 | Hinerman . |
| 2,769,268 | * | 11/1956 | Miller . |
| 2,835,999 | * | 5/1958 | Gillilan . |
| 3,757,455 | * | 9/1973 | Strader ................................ 43/42.14 |
| 5,170,579 | * | 12/1992 | Hollinger ........................... 43/42.06 |

FOREIGN PATENT DOCUMENTS

| 794152 | * | 4/1958 | (GB) .................................. 43/42.06 |
| 94059 | * | 4/1959 | (NO) .................................. 43/42.14 |

* cited by examiner

Primary Examiner—Jack W. Lavinder
(74) Attorney, Agent, or Firm—John S. Hale; Gipple & Hale

(57) ABSTRACT

A fishing lure with three housing sections, a front housing section and a rear housing section, each with spiral fins or propellers that cause them to rotate in opposite directions when the lure is pulled through the water, and a middle housing section to which a fish hook can be attached. A selected housing section contains a compartment into which small metal spheres can be inserted, both to add weight to the lure and to make noise to attract fish. The rear housing section has a compartment for scent, in the form of pellets and has a plurality of apertures through which the scent can diffuse through the surrounding water to attract fish.

16 Claims, 2 Drawing Sheets

FISHING LURE

BACKGROUND OF THE INVENTION

1. Field of Invention

The present invention relates generally to fishing lures and, more particularly, to a rotatable fishing lure which attracts fish by sight, sound and smell.

2. Description of the Prior Art

Fishing lures appear to be most effective when fish are attracted by more than one sense. There are numerous prior inventions for fishing lures which attract fish by sight, sound or smell. The present inventive fishing lure has a central housing section and front and rear housing sections that spin in opposite directions as the lure is pulled through the water, thus attracting fish by sight. The housings have compartments for small spherical metal weights, that rattle as the lure moves, thus attracting fish by sound, and one or more internal compartments holding scent pellets, with apertures through which the scent is diffused through the water, thus attracting fish by smell.

U.S. Pat. No. 1,140,279, issued on May 18, 1915, to Edward D. Myers and U.S. Pat. No. 2,569,057, issued Sept. 25, 1951 to Hinerman discloses an artificial bait or fishing lure with a pair of body sections with spirally curved vanes that revolve in opposite directions as it is drawn through the water. Likewise, U.S. Pat. No. 2,244,378, issued on Jun. 3, 1941, to Edwin B. Turner, Swiss Patent Number 256,420 published Feb. 15, 1949 to Haitro and U.S. Pat. No. 2,494,407, issued on Jan. 10, 1950, to Roy O. Rhodes, discloses an artificial bait, having front and rear sections that rotate independently.

The instant invention is distinguishable, in that it has an internal compartment and apertures for diffusing scent through the water, internal compartments that can be filled with weights, and a separate middle section to which a hook can be attached.

U.S. Pat. No. 1,933,170, issued Oct. 31,1933, to Jethro A. Greider, shows a fish shaped lure with a single spinner rotatably connected to its tail end while U.S. Pat. No. 3,648,397, issued on Mar. 14, 1972, to Donald Du Bois, discloses a fishing lure having a single rotatable element on its front end. U.S. Pat. No. Design 227,250, issued on Jun. 12, 1973, to Ewell J. Harris, discloses a spinning spoon type fish lure. British Patent Number 579, application accepted Apr. 1, 1909, to William Britton Tuck, discloses a spinning bait for use in angling, with angular vaned rotating front and rear parts. The center portion of the bait can be metal, wood or the body of a natural bait and is weighted with lead keeping the body in an upright position when in the water.

U.S. Pat. No. 4,962,609, issued on Oct. 16, 1990, to Russell D. Walker, discloses a fish attractant scented fishing lure with a single body portion having recesses filled with fibrous material impregnated with a liquid fish attracting substance. The instant invention is distinguishable, in that it has an internal compartment in which a fish attracting substance can be stored, with a plurality of apertures through which the attracting substance is diffused. The scent in the instant invention can be in the form of pellets, which dissolve and diffuse more slowly than liquid scent, providing a longer lasting more effective bait.

U.S. Pat. No. 5,170,579, issued on Dec. 15, 1992, to Douglas D. Hollinger, discloses an artificial fish lure, with a first embodiment shaped like a fish swallowing another fish, and a second embodiment shaped like a crayfish. The lure housing has a pouch for bait or scent, and a hollow chamber for weights. The instant invention is distinguishable in that it has oppositely rotating front and rear sections unlike the single bodied '579 patent and its internal chambers for scents and weights are larger allowing more scent to diffuse from the lure and the weights more room to rattle to attract fish.

None of the above inventions and patents, taken either singularly or in combination, is seen to teach the instant invention as claimed.

SUMMARY OF THE INVENTION

The present invention is directed to a fishing lure with three housing sections: a front housing section and a rear housing section, each with spiral fins or propeller that cause them to rotate in opposite directions when the lure is pulled through the water, and a middle housing section to which a fish hook can be attached. A fish hook can also be attached to the rear section, while a fishing line is attached to the front section. The front housing section, and/or the rear housing section, contain a compartment into which small metal spheres can be inserted, both adding weight to the lure and to make noise to attract fish. The rear housing section has a compartment or cavity for scent, which may be in the form of pellets. The rear housing section defines a plurality of thoroughgoing apertures leading into and communicating with the scent cavity through which the scent can be diffused through the surrounding water to attract fish.

Accordingly, it is a principle object of the invention to provide a fishing lure that can attract fish by sight through the rotating motion of the lure.

It is another object of the invention to provide a fishing lure that can attract fish by sound emitting from the lure.

It is a further object of the invention to provide a fishing lure that can attract fish by smell emanating from the lure using scent pellets having a long life.

Still another object of the invention is to provide a fishing lure that can attract fish by a combination of sight, sound and smell or a combination of either sound or smell.

It is an object of the invention to provide improved elements and arrangements thereof in an apparatus for the purpose described which is inexpensive, dependable and fully effective in accomplishing its intended purposes.

These and other objects, advantages, and novel features of the present invention will become apparent when considered with the teachings contained in the detailed disclosure along with the accompanying drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
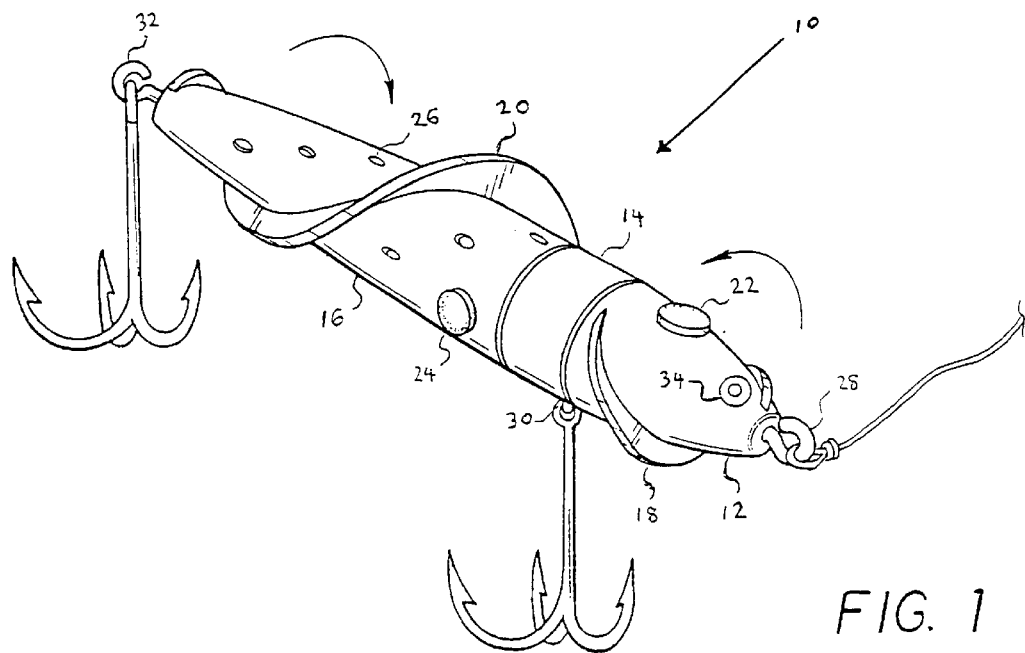
FIG. 1 is a perspective view of the rotating fishing lure invention.

The present invention is a rotating sectioned fishing lure, with internal compartments that hold scents and weights, and oppositely rotating front and rear sections. The preferred embodiment and best mode of the invention is shown in FIGS. 1 through 3.

The fishing lure 10 has a front tapered housing section 12, a middle cylindrical housing section 14, and a rear tapered housing section 16. Each housing section has an outer curved shell 11 and an inner cylindrical tube section 15 secured to the outer shell. The front housing section 12 has a spiral fin 18 mounted on it or integrally formed with the housing that causes it to rotate in a counterclockwise direction as the lure is pulled forward in the water. The rear housing section has a spiral fin 20 mounted on it or integrally formed with the housing that causes it to rotate in a clockwise direction. (Alternatively, the fins could be configured to cause the front section to rotate clockwise and the rear housing section to rotate counterclockwise.) The sight, sound and turbulence caused by the opposite spinning housing sections 12 and 16 is one aspect of the lure that attracts fish. Internal compartments or cavities 38 and 38a shown in phantom on FIG. 2 are formed in the front and rear housing sections. These compartments have circular openings 15 allowing insertion of scent pellets and weight spheres and are closed by resilient deformable stoppers 22 and 24. The stoppers are preferably plug shaped and made of rubber or plastic. The compartment 38 in the front housing section can hold weights, preferably metal spheres such as BB shot, that cause the lure to sink in the water, and generate noise as the front housing section turns to attract fish. The compartment 38a in the rear housing section can hold fish attracting scented substances such as pellets that diffuse through apertures 26. Alternatively, the compartment in the rear housing section may be divided by a screen or perforated partition (not shown) into a front portion holding scented substances and a rear portion holding weights. The spinning of the lure's housing sections helps to diffuse the scent through the water. The front housing section has an eyehook 28 located at one end of rod 42 by which the lure can be attached to a fishing line. The middle and rear housing sections have eyehooks 30 and 32, respectively mounted to the middle housing section and located on the other end of rod 42 to which fishhooks can be attached. Markings such as an eye 34 on the front section can make the lure resemble prey to predatory fish.

Figure 2:
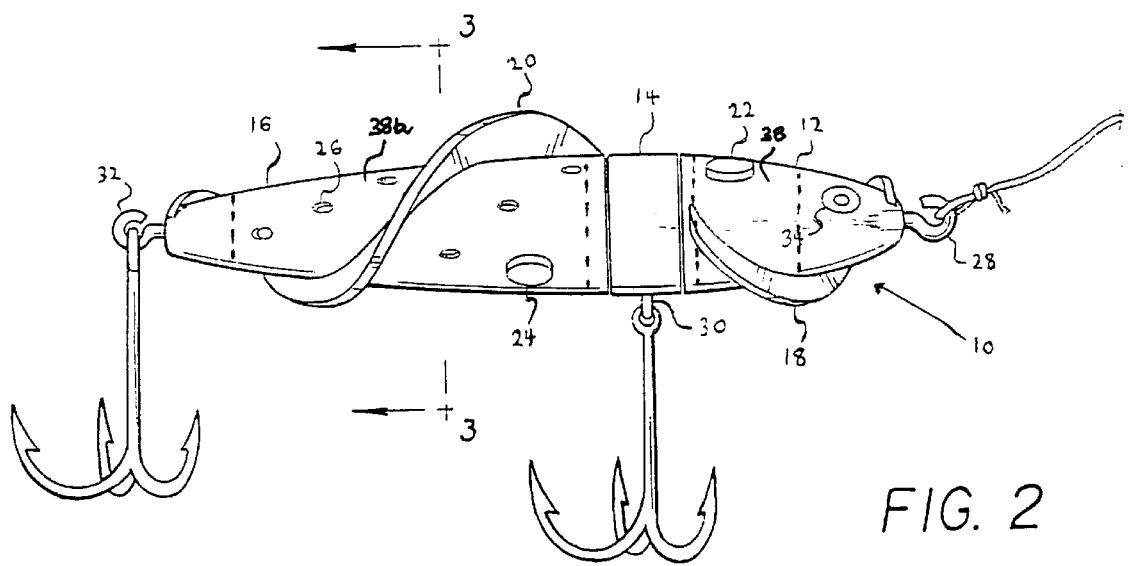
FIG. 2 is a right side elevational view of the the invention shown in FIG. 1.
Figure 3:
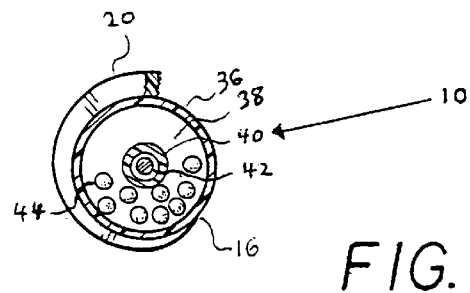
FIG. 3 is a cross-sectional view of the invention taken along lines 3—3 in FIG. 2.

FIG. 3 is a cross-sectional view of the first embodiment of the invention 10 taken along line 3—3 in FIG. 2, through the rear housing section 16. Shown are the spiral fin 20, external shell 36, interior compartment 38a, and the middle tube 40 holding rod 42 which is the axis on which the lure rotates. Rod 42 ends in the eyehooks 28 and 32 as previously described and shown in the figures. Also shown are scent pellets 44. It is preferable that the scented substance be in the form of pellets, as these will dissolve and diffuse the scent more gradually.

Figure 4:
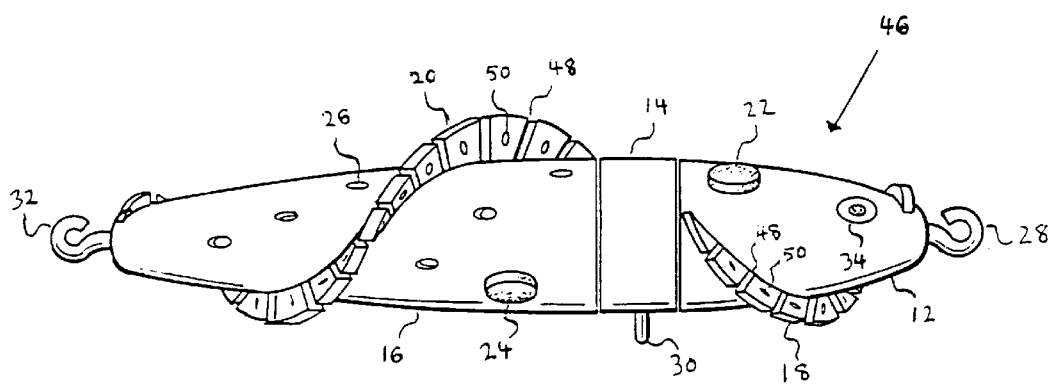
FIG. 4 is a right side elevational view of another embodiment of the rotating fishing lure invention.

FIG. 4 shows another embodiment of the invention 46, which is the same as the first embodiment except that spiral fins 18 and 20 are separated into segments 48 at regular intervals. Each of the segments 48 is provided with a centrally positioned throughgoing aperture 50.

Figure 5:
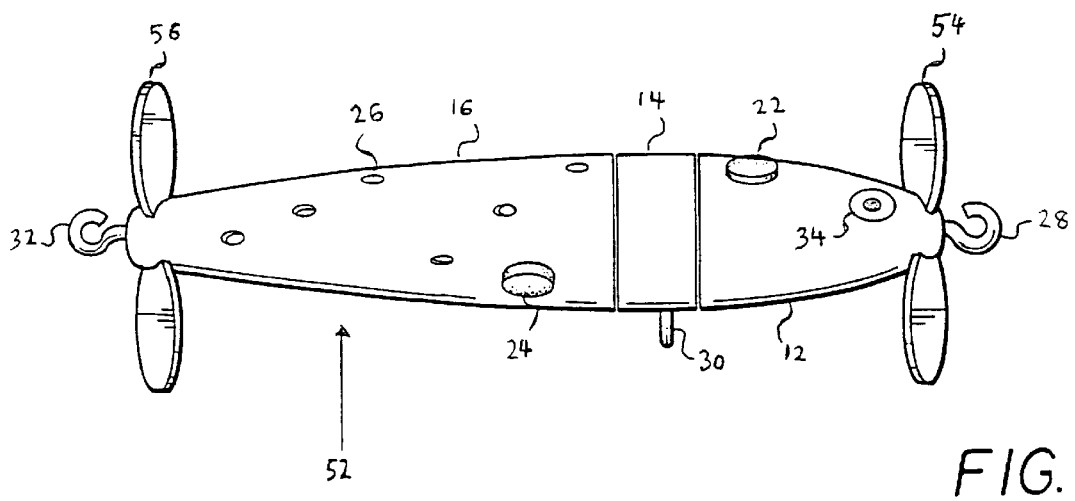
FIG. 5 is a right side elevational view of yet another embodiment of the rotating fishing lure invention.

FIG. 5 shows yet another embodiment of the invention 52, which is similar to the previously described embodiments, except that the spiral fins are replaced by a front propeller 54 and a rear propeller 56. The two propellers are configured so as to rotate in opposite directions when the lure is pulled forward in the water. The front propeller 54 is rigidly attached to the front housing section 12, and the rear propeller 56 is rigidly attached to the rear housing section 16, so that the front and rear housing sections rotate with the propellers.

In all the embodiment there are bushings (not shown) between the housing sections to reduce friction when they rotate.

In the foregoing description, the invention has been described with reference to a particular preferred embodiment, although it is to be understood that specific details shown are merely illustrative, and the invention may be carried out in other ways without departing from the true spirit and scope of the following claims:

I claim:

1. A fishing lure, comprising:
   a sectional housing comprising a front housing section and a rear housing section rotatably mounted on a rod member, each housing section having a spiral fin mounted thereon causing the housing section to rotate when the lure is pulled through a body of water; each spiral fin being broken into a plurality of separate segments, each of which has throughgoing apertures and
   an interior compartment defined in at least one of said housing sections, a bore leading from the outside of a housing section into said interior compartment and removable plug means mounted in said lure.

2. A fishing lure according to claim 1, wherein said housing section defines a plurality of bores leading into said interior compartment allowing the contents of said compartment to communicate with the fluid media outside of said fishing lure.

3. A fishing lure according to claim 1, wherein the spiral fins are configured so as to cause the front and rear housing sections to rotate in opposite directions when the lure is pulled through a body of water.

4. A fishing lure according to claim 1, including a middle housing section mounted between the front housing and rear housing sections.

5. A fishing lure according to claim 4, including an eyehook mounted on an external surface of the middle housing section.

6. A fishing lure according to claim 4, including a rod member mounted in, enclosed by and passing through a longitudinal cylindrical tube support formed in the front, middle and rear housing sections, said rod member forming an axis on which at least said front and rear housing sections can rotate.

7. The fishing lure according to claim 6, wherein the rod member has a front eyelet and rear eyelet.

8. A fishing lure, comprising:
   a front housing section, a middle housing section and a rear housing section rotatably mounted on a rod member, each of said housing sections defining a center tube support, said rod member passing through the longitudinal center of the front, middle and rear housing sections mounted in said center tube support, said rod forming an axis on which each section can rotate, a vane means mounted on said front housing section and said rear housing section causing the housing sections to rotate when the lure is pulled through a body of water;
   said vane means being configured so as to cause the front and rear housing sections to rotate in opposite directions when the lure is pulled through a body of water;
   an interior compartment defined in said front housing section and said rear housing section, at least one bore leading into said interior compartment of said front housing section and at least one bore leading into said interior compartment of said rear housing section and plug means for each bore.

9. A fishing lure according to claim 8, wherein each spiral fin is a single continuous piece.

10. A fishing lure according to claim 8, wherein a compartment is formed in said rear housing section, said rear housing section defining a plurality of bores leading into said compartment and allowing fluid communication with the outside medium.

11. A fishing lure according to claim 8, wherein said plug means is a resilient cylindrical shaped member.

12. A fishing lure according to claim 8, wherein one of said housing section interior compartments contains scent pellets.

13. A fishing lure according to claim 8, wherein one of said housing sections contains a plurality of spherical weights.

14. A fishing lure according to claim 8, wherein said vane means is a spiral fin broken by notches at regular intervals into separate segments, with each separate segment defining an aperture.

15. A fishing lure according to claim 8, wherein said vane means is a spiral fin.

16. A fishing lure, comprising:

a front housing section, a middle housing section and a rear housing section rotatably mounted on a rod member, a propeller mounted on a front end of said front housing section and a rear end of said housing section and a rear end of said rear housing section causing the housing sections to rotate when the lure is pulled through a body of water;

the said propellors being configured so as to cause the front and rear housing sections to rotate in opposite directions when the lure is pulled through a body of water;

an eye hook mounted on said middle section to receive a fishing hook and an eye hook mounted at the end of said rear housing section rearward of said rear housing propeller; and an interior compartment defined in at least one of said housing sections, with a closable opening leading into said interior compartment.

* * * * *